Sept. 15, 1959

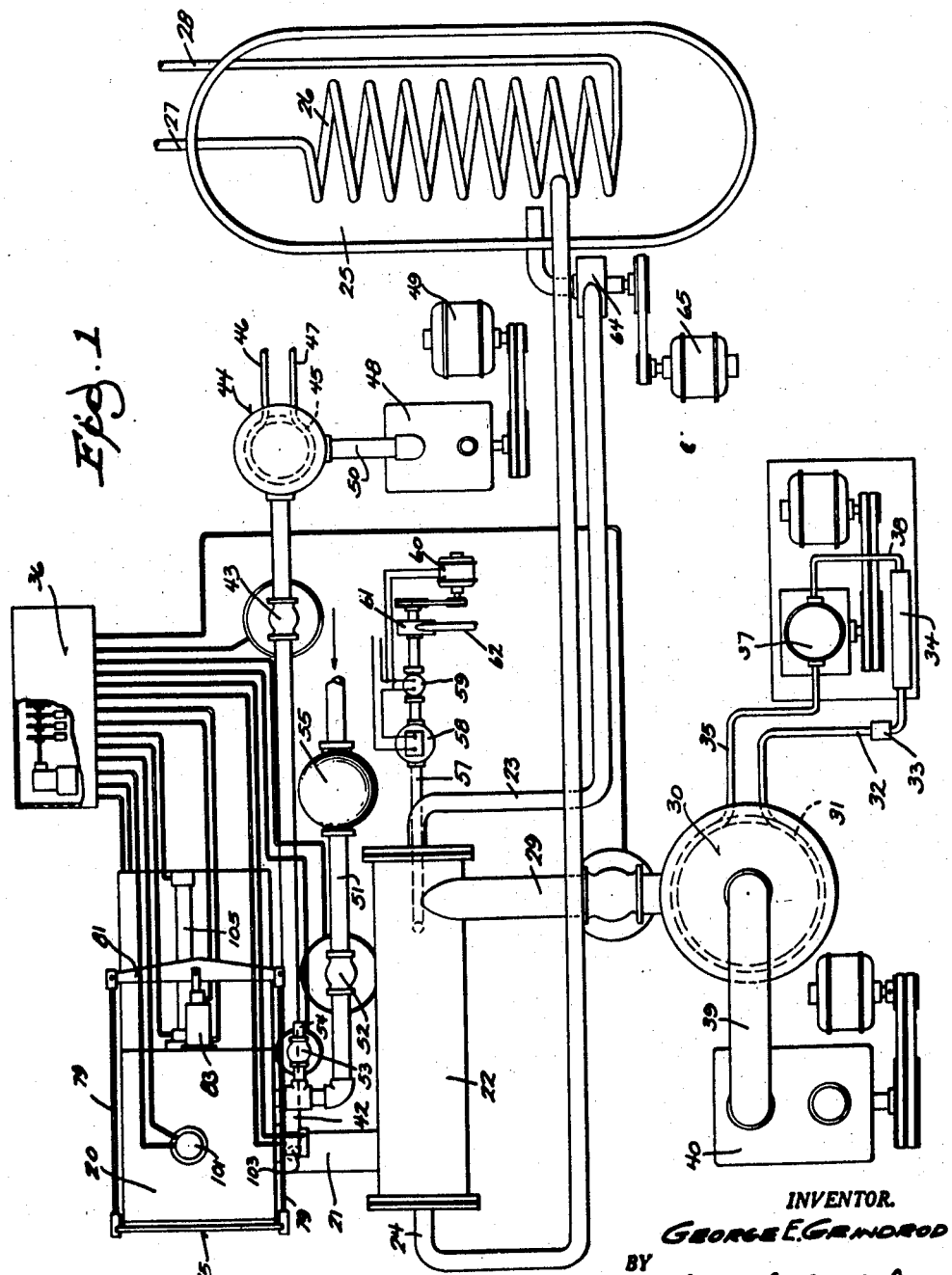

G. E. GRINDROD 2,904,441

STERILE PACKAGED FOOD

Filed July 22, 1957

INVENTOR.
George E. Grindrod

BY

ATTORNEYS

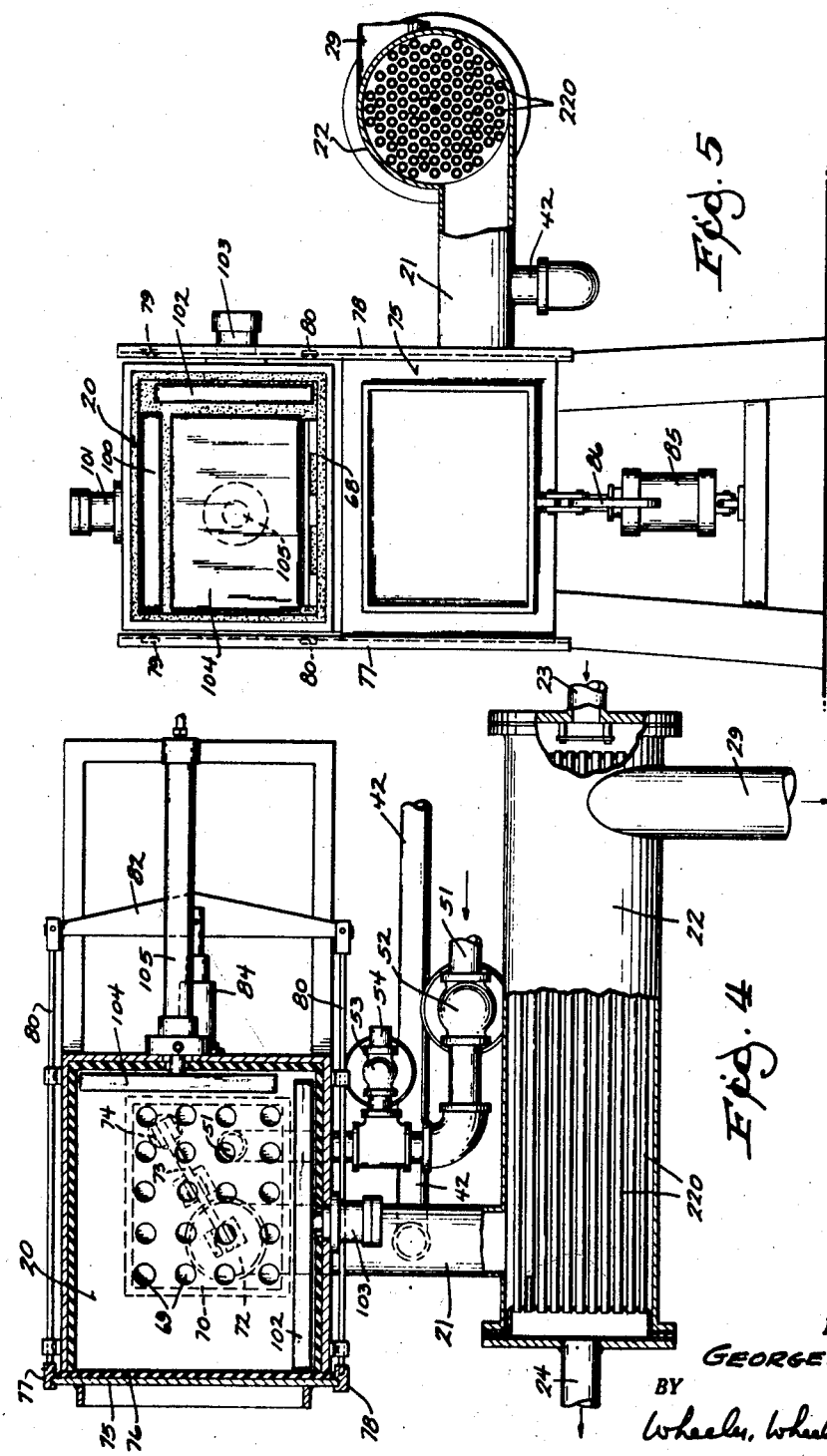

Sept. 15, 1959  G. E. GRINDROD  2,904,441
STERILE PACKAGED FOOD
Filed July 22, 1957  5 Sheets-Sheet 4

INVENTOR.
GEORGE E. GRINDROD
BY
Wheeler, Wheeler + Wheeler
ATTORNEYS

Sept. 15, 1959 G. E. GRINDROD 2,904,441
STERILE PACKAGED FOOD
Filed July 22, 1957 5 Sheets-Sheet 5
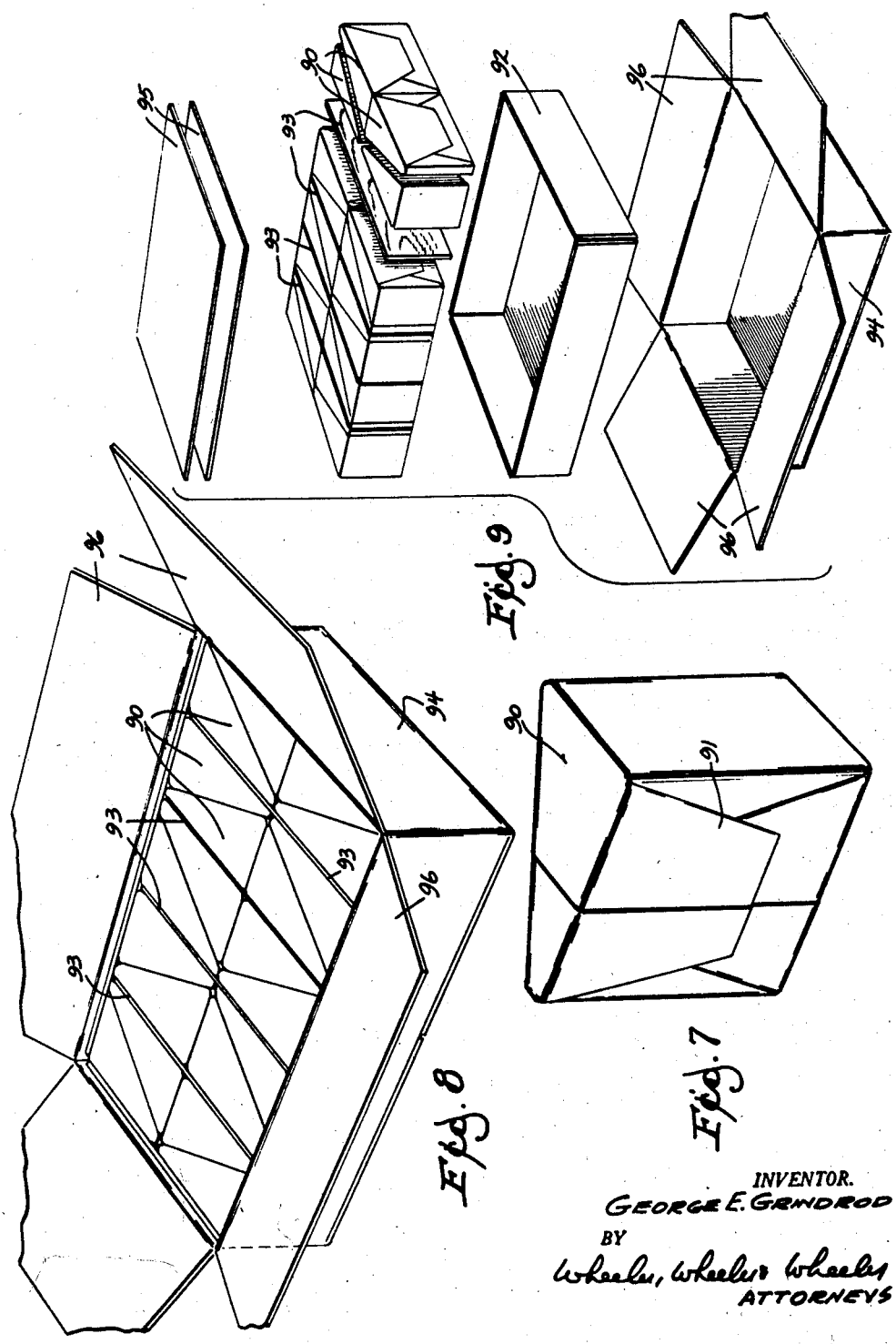

United States Patent Office 2,904,441
Patented Sept. 15, 1959

2,904,441
STERILE PACKAGED FOOD

George E. Grindrod, Oconomowoc, Wis.

Application July 22, 1957, Serial No. 673,266

13 Claims. (Cl. 99—174)

This invention relates to a sterile packaged food and the means and method of achieving mold free and air free packaging.

The present application is a continuation in part of my application Ser. No. 445,020 entitled Process and Apparatus for Sterilizing Surfaces of Food Materials, filed July 22, 1954. The present disclosure differs somewhat from that of the parent application above identified, since continuing experimentation has indicated that some of the features of the former disclosure are unnecessary, while others are more important than they were deemed to be at the time the parent application was filed.

Fundamentally, I am interested in packaging water-containing foods such as cheese and meat by a process which involves enclosing the food in a film of synthetic resin, lapping portions of which may be partially sealed, the wrapped food being thereafter subjected to a degree of vacuum well below its vapor pressure, whereby ebullition of water vapor from the food displaces and entrains and carries off all residual oxygen including not only free oxygen but that which is occluded in, absorbed in, dissolved in, or adsorbed upon the food, the sealing of the wrap being perfected before the vacuum is released. The resulting food product, particularly when the food consists of Cheddar cheese, is oxygen free and visually different from any previously known form of Cheddar cheese in that it is completely lacking in any orifices or voids such as those which are present in Cheddar cheese as heretofore known. The method is effective against surface contamination and in prevention of rancidity.

The energy released by water evaporated under the conditions contemplated in the present invention is enormous as compared to the forces which act in simple evacuation. When water is evaporated from food in consequence of a reduction of absolute pressure well below the vapor pressure of the food, the evaporated water releases kinetic energy approximating 5.3% of its total latent heat. The energy released will vary slightly according to the degree of vacuum, but it does not vary to any great extent from the value given. This amounts to more than 4,000 foot pounds of energy for each pound of water evaporated. This energy appears as velocity of the vapor leaving the surface of the food from which the vapor is evolved. The effect is a violent ebullition which frees and entrains dissolved and occluded oxygen.

Kinetic energy released in this way is sometimes referred to as "latent heat of volume." The effect of the latent heat of volume is a major factor in accounting for resistance to rancidity and other deterioration of foods packaged according to the present invention.

Typical conditions of operation are as follows:

A high quality vacuum pump, evacuating products containing water, will approach a vacuum of 29.3 inches of mercury as its limit without such special equipment as hereinafter described. This removes 98% of the free air. In the practice of my process, I maintain around the product an absolute pressure of 7 mm. or less for such a period of time as will cause the evaporation of about 50 cubic feet of water vapor for each cubic foot of free air space. At 7 mm. absolute pressure, one pound of water occupies more than 2,000 cubic feet. When the volume evaporated is 50 times the free air space, the extent of air removal is about 99% of what would otherwise remain. I therefore reach a degree of air removal which approximates 99.98%, or beyond the range of measurement. This extreme evacuation is accomplished by means hereinafter described.

In the preferred practice of the process, I use apparatus which includes a plurality of vacuum pumps and a plurality of condensers through which the vapor is withdrawn. In the first stage of evacuation, a water cooled condenser will suffice. In final stages of evacuation, using freeze-out condenser, the final condenser pressure reaches an absolute value at least as low as five millimeters. Only by using multiple vacuum pumps and separate condensers is it practicable to practice this process on a commercial basis.

In a further preferred step in the commercial practice of the invention, air-free steam at a temperature of 150° F. to 190° F. is admitted about the product for a period of 20 to 60 seconds after its initial evacuation and prior to final evacuation and sealing. This steam has several purposes, among which are sterilization of the surface of the food to destroy or inhibit growth of mold spores; softening the plastic film to permit sealing at lower temperatures than would otherwise be required; further dilution and washing out of any residual oxygen, and the provision of heat which assists in the sealing operation.

Another feature which is desirably employed in the preferred practice of the invention is multiple sealing. So far as I am aware, there has never previously been any method of sealing a number of food-containing packages simultaneously. In the preferred practice of this invention, the preliminarily wrapped products are packed in the carton in which they are ultimately to be shipped and are then vacuum treated, steam treated, and sealed concurrently in the carton. In accomplishing this result, it has been found desirable to use mechanical pressure not only to force out of the packages any residual vapor or gas but, more particularly, for the purpose of insuring intimate contact of all lapping portions of the wrapping film in order that the seal may be perfect.

It may be observed here that both the cheese and the meat products which have been listed as primary examples of food material which can be sealed according to the present invention contain not only water, but fat. It has been found that there is at present only one single-ply film which is completely impervious in and of itself. However, in the practice of the invention according to the preferred method hereinafter disclosed, fat is brought to the surface of the food by the heat of the steam treatment preliminary to the final evacuation, compression, and sealing thereof, and this fat serves effectively to close any remaining pores in the wrapping material so that the seal which results is substantially completely effective.

Even without heating, bacon packaged using latent heat of volume by subjection to vacuum below its vapor pressure as above described has been kept for three months and more without mold or rancidity, and bread has been kept fresh for six months. Cheddar cheese seems to keep for any reasonable merchandising period or indefinitely.

In the drawings:

Fig. 1 diagrammatically illustrates apparatus embodying, and used in the practice of, the invention, parts being shown in plan and other parts in section.

Fig. 4 is a view in horizontal section through the device of Fig. 2, portions being shown in plan.

Fig. 5 is a view in end elevation of the device of Fig. 2.

Fig. 7 is a view in perspective showing a wrapped product in readiness for treatment.

Fig. 8 is a view in perspective of an open box containing a number of packages such as that shown in Fig. 7.

Fig. 9 is a view showing separately the various component parts of the box and contents.

Figures 2, 3:
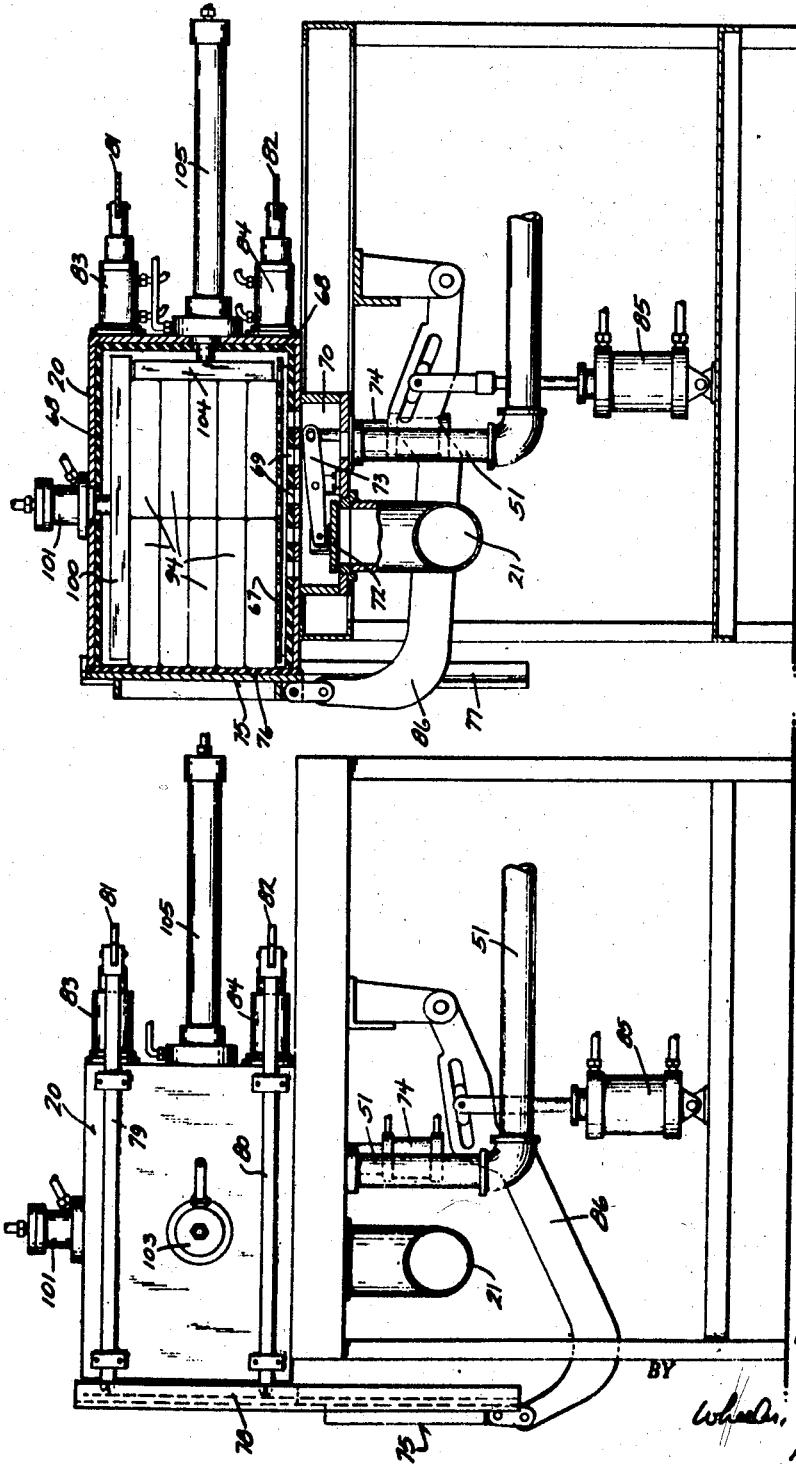
Fig. 2 is a view in side elevation of a treatment chamber organized for the application of three dimensional pressure on the work.
Fig. 3 is a view in longitudinal section through the chamber of Fig. 2.

The invention as herein disclosed is based upon certain principles and findings of my research and is presently in commercial use. Most of these principles and findings are believed to be new and not heretofore published. Among these are the following:

(1) Boxes, paper, wood and wrapping materials such as plastic rubber-like films offer practically no resistance to the flow of steam if fixed gases are absent and do not interfere with substantially uniform and instantaneous surface heating or cooling. If a product containing water is subjected to vacuum at an absolute pressure which is less than the vapor pressure of free water in the product at its then temperature, the product evolves water and becomes colder. The volume of water vapor given off is great with respect to volume of fixed gases and washes out these gases to an extent far below that obtainable by vacuum alone. If, following the elimination of fixed gases, steam is admitted about the product, the steam will instantly permeate all space not occupied by solids and will create a surface temperature which is uniform throughout and which corresponds to the absolute pressure maintained.

The quick permeation of wood, cardboard, paper, and wrapping materials by steam following extreme evacuation beyond the vapor tension of the material is a most important finding. The steam does not penetrate a hydrated colloid, but follows its surface only.

(2) Few, if any, plastic (single-ply synthetic resin) wrapping materials are impervious. Even those that are relatively impervious are incapable of heat sealing without rendering pervious the area in which the heat seal is made. Moreover, even the relatively impervious material such as rubber hydrochloride or vinyl, nitrile or vinylidine chlorides which are nearly impermeable to gases at normal temperatures, become soft and permeable to steam or water vapor at temperatures of 150° F. and higher. They also become capable of passing air with the steam, a fact of which I take advantage in the preferred practice of this invention. Steam admitted about the partially wrapped materials following evacuation to the extent described above is found to pass through the wrapping film or the heat seal made in packaging to secure substantially instantaneous heating of the surface of the solid food product to the temperature of the steam. By way of example, and not by way of limitation, it is noted that the preferred thickness of the wrapping materials used is 75 gauge as a minimum (.00075 inch).

(3) The steam is believed to release completely some fixed gases held to the various surfaces as molecular films. Consequently, upon subsequent vacuum withdrawal of the steam, the outgoing steam carries some fixed gases not removable by vacuum alone. Upon withdrawal of the steam by opening a large valve to a condenser, both the residual gas and the steam leave the packages and the entire contents of the vacuum receptacle become cold. The initial decline of temperature from sterilization range to a non-damaging range is practically instantaneous throughout the entire enclosure.

(4) Adhesive contact of most impervious wraps, on a solid such as cheese prevents mold growth in the area of contact. Adhesive contact has heretofore been secured to some degree by maintaining continuous pressure on packages of cheese for long periods of time. Using the process herein described, instantaneous and complete adhesive contact is achieved on any product which has a sufficiently uniform shape. This adds insurance of keeping quality for some products having uniform outside shapes. The complete adhesion adds materially to the appearance of products packaged by this method.

For practical reasons, I attempt to effect removal of all fixed gases from the product in the vacuum receiver within a short interval of time such as one to five minutes. The free gases plus about 50 to 100 volumes of attenuated water vapor are removed. The removal of the air or fixed gases reaches a point beyond measurement by any means now available. It is less than the absolute pressure indicated by the vacuum gauge. One object of this extreme gas removal is to permit complete and uniform penetration of the steam which is to be admitted in the next step.

Referring to Fig. 1 the treating chamber 20 has an evacuating connection at 21 connected by pipe 42, controlled by valve 43 with condenser 44. Condenser 44 is cooled by coil 45 which is served by water supply and return pipes 46 and 47. The vacuum in chamber 44 is maintained by a vacuum pump 48 driven by motor 49 and communicating with chamber 44 through pipe 50.

For effecting high vacuum in the treating chamber, the evacuating connection 21 also leads to a water cooled condenser 22, the water tubes 220 (Fig. 4) of which may conveniently be connected by pipes 23, 24 in circuit with a water supply tank 25 which is refrigerated by means of coil 26 having connections 27, 28 to a source of refrigerant (not shown).

From condenser 22 a further evacuating connection is supplied by pipe 29 which leads to a condenser 30 which contains an evaporator coil 31 of the direct expansion type operating in practice, at about −40° F. and having a supply pipe 32 leading through reducing valve 33 from the refrigerant condenser 34. Coil 31 freezes residual water vapor to ice at about 10° F., and defrosting of coil 31 at intervals of a few hours is desirable. This is done by conventional procedures not requiring description here. The return pipe 35 returns the evaporated refrigerant to motor driven compressor 37, which delivers the compressed vapor through pipe 38 back to the condenser.

The non-condensible gases pass from the condenser 30 through pipe 39 to the two-stage vacuum pump 40 which desirably is capable of maintaining an extremely high degree of vacuum. In practice the condensers hold the pressures at the pump inlet to about 7 mm. absolute. This pump may operate more or less continuously to keep the condenser 30 fully evacuated so that, upon the opening of valve 41 in pipe 29, a very high degree of vacuum will immediately be communicated through condenser 21 to the treatment chamber 20.

Steam connections to treatment chamber 20 are provided by means of steam pipe 51, leading from any suitable source of steam (not shown). This pipe is controlled by valve 52 and has an atmospheric connection through valve 53 which, when open, admits atmospheric air to chamber 20 through inlet pipe 54. Obviously the atmospheric connection could open directly into chamber 20 but by connecting it to the steam pipe, one connection to the chamber 20 is eliminated. The steam pipe may be provided with pressure dome 55, if desired.

Suitable means is provided for withdrawing condensate from the several condensers 22, 30 and 44. A typical arrangement is illustrated in Fig. 1 in connection with condenser 22 only. The drain pipe 57 leading from the condenser is equipped with a float switch at 58 controlling a solenoid valve 59. When accumulations of condensate lift the float to close valve 59 the circuit of motor 60 is energized to operate pump 61 for discharging condensate through pipe 62.

Where a liquid refrigerant is to be recirculated, suitable means for power circulation may be employed. This is exemplified by the use of the pump 64 driven by motor 65 and incorporated in the pipe 23 from refrigerated water tank 25 to condenser 22 so that the cooling of condenser 22 will not depend on mere gravity circulation of the coolant.

Fig. 3 includes a view of the treatment chamber 20 in cross section. The material to be treated rests upon a foraminous false bottom 67. The entire chamber has a lining 68 of rubber or the like which is not only easily washed but serves as a thermal insulating means. Ports at 69 in the rubber lining at the bottom of the chamber provide free communication between the chamber and the auxiliary chamber 70 into which the evacuating pipe 21 and the steam pipe 51 open. The valve 72 is disposed within chamber 70. It fits across the end of pipe 21 and is operated by an actuating lever 73 to which motion is imparted by the ram 74.

Treatment chamber 20 has a door or gate 75 which is opened and closed by power. This door has a rubber lining 76 like the rest of the chamber and this lining also serves as a gasket to seal the door to the chamber as shown in Figs. 3 and 4.

The door is reciprocable in ways 77, 78 (Figs. 2, 4 and 5). These are carried by upper and lower pairs of pull rods 79 and 80 connected by cross heads 81, 82 at the rear of the chamber 20 to be moved in and out by rams 83, 84 respectively. With the cross head in their retracted positions as shown in Fig. 2, the ways are moved outwardly from the chamber to release the gasket lining of door 75 from the end of the chamber, thereby freeing the door for vertical reciprocation in its ways 77, 78. The door 75 may thereupon be moved from the closed position of Fig. 3 to the open position of Fig. 2 by the action of ram 85 on the door actuating lever 86. With the material inserted in the chamber for treatment, ram 85 is supplied with pressure to actuated lever 86 to restore the door from open position illustrated in Figs. 2 and 5 upwardly into registry with the chamber, whereupon the rams 83, 84 are supplied with pressure to advance the cross heads 81, 82 thereby pulling the door against the end of the treatment chamber to tightly seal the entrance thereto.

Figure 6:
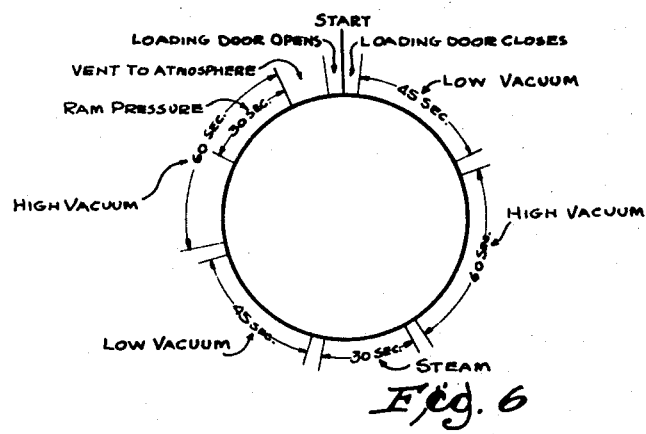
Fig. 6 is a cycle chart illustrating the desired practice of the method invention when the apparatus of Figs. 1–5 is used.

The device may be operated manually or by automatic control in accordance with the cycle shown in Fig. 6. In Fig. 1 I have diagrammatically illustrated at 36 a motor driven timer of generally conventional type having a cam shaft provided with cams for actuating switches to control the operation of the various steam, vacuum, atmospheric relief, and hydraulic ram valves as required to carry out the desired cycle.

Immediately after the starting point represented at the top of the circular diagram in Fig. 6, the loading door is closed and valves 72 and 43 are opened whereby vacuum amounting to 28 to 29 inches of mercury developed by vacuum pump 48 is communicated to the chamber. Absolute pressure in the chamber drops to about 2 inches of mercury. Gases evacuated from the chamber pass through the condenser 44 to reduce the load on the vacuum pump, condensible vapors being condensed so that the pump has to work principally on non-condensible gases. This degree of vacuum is maintained for about 45 seconds.

After a 5 second delay, valve 43 is closed and valve 41 is opened to communicate to the treatment chamber 20 the high degree of vacuum delivered by the two-stage pump 40 in condenser 30. Absolute pressure in the chamber drops to .2 inch of mercury (5.06 mm.). High vacuum is maintained for about a minute before valves 72 and 41 are closed.

After another brief delay, of the order of five seconds, steam from dome 55 and pipe 51 is admitted to the treatment chamber by opening valve 52. This may raise the absolute pressure in the chamber to 12 inches of mercury. Valve 52 may remain open for a period of about half a minute. In the ensuing brief dwell the pressure may drop to 3 inches of mercury. Valve 52 then closes and valves 72 and 43 re-open to withdraw the steam and vapor from the treatment chamber through the low vacuum condenser 44 and vacuum pump 48. After about 45 seconds exposure to low vacuum at about 2 inches absolute pressure, the chamber 20 is subjected to high vacuum by the closing of valve 43 and the re-opening of valve 41. The high vacuum remains effective at .2 inches absolute pressure for about a minute and a half, after which the chamber 20 is vented to the atmosphere by closing valves 72, 43 and 41 and opening valve 53.

The single stage primary pump followed by a two-stage high vacuum pump would, if used with dry apparatus, and without flow, produce a vacuum involving pressures less than 1/1000 of an atmosphere. In order to evaporate water from a product assumed to be at 60° F., a reduction in pressure below 13 mm. absolute is required. In order to secure this vacuum with adequate flow into the condensers and the respective pumps, the high vacuum pump should maintain an inlet pressure of 2 mm., which corresponds to the boiling point of ice at 10° F. This ice temperature is that actually maintained in my commercial apparatus by the evaporation coil 31 as above described. Thereby I remove 50 to 100 volumes of attenuated water vapor and free gases entrained therewith.

The treatment chamber has a cubic capacity of 3.6 cubic feet and can easily handle 1.5 cubic feet of packaged product, leaving 2.1 cubic feet of free space around the product. The free air capacity of the vacuum pumps is about 35 cubic feet per minute or 10 c.f.m. of pump capacity for each cubic foot of treatment chamber capacity. The vapor outlet from the treatment chamber to the condenser and vacuum pump gives unrestricted passage of 5 square inches for each cubic foot of treatment chamber capacity. This proportionate size is desirable to give a practicable rate of flow for the greatly expanded gases. Any reduction in relative flow capacity may increase required treatment time but it will be understood that there is nothing critical about these proportions.

In the particular commercial device illustrated, the single stage condenser 44 has a volume of 3.5 cubic feet and a capacity of 8000 B.t.u.'s per minute. Second stage condenser 22 has a capacity of 1600 B.t.u.'s per minute. Third stage condenser 30 has a capacity of about 600 B.t.u.'s per minute at 0° F. Time is less critical in the latter stages of evacuation and cooling, since by the time the action of condenser 30 becomes effective or necessary, the surface of the product will already have been cooled well below the point of injury by the heat of sterilization.

All figures given are taken from a typical commercial apparatus and are reported merely by way of exemplification, without any intention that they be regarded as limiting the invention.

A major feature of the invention is the virtually instantaneous reduction of surface temperature of the product after its brief treatment at relatively high temperatures by the steam. It being impracticable to condense all of the outgoing water vapor in any one condenser within the permissible time interval, the condenser is made in three parts. Condenser 44 will remove a large part of the condensible vapors using cold water only to circulate through coil 45. Condenser 22 condenses the major part of the residual condensible vapors by means of circulating ice water. Condenser 30 removes by condensing and freezing substantially the entire remainder of condensible vapor.

The temperature developed by the steam admitted to the treatment chamber 20 will ordinarily range from 150°

F. to 190° F. depending on the time of exposure, the nature of the product, the degree of sterility required and, depending further on the optional use of a sterilizing gas in the manner hereinafter to be described. In no case is the material exposed to steam sterilizing temperatures for any period longer than is required to sterilize its surface.

Surface may be understood to mean some depth. Some penetration is certain but cannot be measured. The heat must penetrate enough to kill spores which are on the surface and must at the same time remove the molecular gas film supposed to adhere to all surfaces. On cheese, the penetration is limited closely to the first evidence of reversing the emulsion or releasing visible oil. The effort is made to secure adhesion of the wrap, kill mold, and avoid more than a thin film of released oil.

As already indicated, the product under treatment may be already wrapped and completely boxed in advance of treatment. Fig. 7 shows a wedge-shaped package 90 resulting from enveloping a block of cheese of the indicated shape in a wrapper 91 of plastic film. Practically any wrapping film except cellophane has been found appropriate. This wrapper is desirably left unsealed at the commencement of the process since it inherently becomes tightly bonded to the material during treatment as a result of the heat and vacuum and oils or other juices excreted from the cheese or other produce during treatment. While the wrapper may be completely unsealed, the seal will ordinarily be incomplete despite any effort at producing a perfect seal, since wrapping films are ordinarily somewhat pervious and the heat sealing operation itself has a tendency to leave quite pervious the areas which have been exposed to heat.

In practice, a number of the wrapped blocks 90 are fitted together to make a unit of rectangular form. Four of the wedge-shaped blocks comprise such a unit. The four block unit is then assembled with other similar units in a tray 92, dividers of soft wood being used at 93 between units. The tray is then placed in a carton 94 and the units and dividers are covered by one or more filling sheets 95 after which the cover flaps 96 of the carton will be closed in the usual way. It will require some pressure to close the flaps over the filler plies, the latter being used to assure the complete filling of the carton, with a view to the desired use of pressure on the carton in a manner which is optional and not yet described.

When one or more cartons of this type are placed in the treatment chamber, the vacuum and steam readily penetrate the wall of the sealed carton and also penetrate to the surface of all portions of the carton contents. The wood dividers 93 are used to facilitate such penetration, having been found to be readily permeable both by the vacuum and the steam. In practice, the cheese packages 90 contain about eight ounces each and the cheese contents are wrapped in a flexible membrane of vinyl chloride of about .001 inch in thickness. The total amount of cheese per carton 94 is therefore about ten pounds.

As already indicated, the unsealed wrapping web 91 readily permits air and water vapor and fixed gases to escape from the individual packages during the initial vacuum treatment. During the subsequent application of pressure, the steam would tend to seal the wrappers but for the fact that these webs become highly permeable to steam and water vapor and other gases at about 150° F. and higher temperatures. Accordingly, the steam passes right through the wraps or the heat treated joints to act on the surfaces of the solid product.

During the ensuing vacuum operation, the steam and water vapor and any remaining gases pass outwardly through the wrapper and concurrently chill the product to effect instantaneous reduction of its surface temperature from a sterilizing range to a non-damaging range. Meantime the wrapper has become adherent to the surface of the product and, upon cooling, has become non-permeable, thereby maintaining the surface sterility achieved during heat treatment. When the vacuum is released, atmospheric pressure aided by any mechanical means used, molds the wrapper into absolute conformity with the product to maintain it adhered to the entire surface, regardless of minor irregularities in that surface. Particularly in the case of an oily product, oil exuding from the surface during the steam treatment aids in closing the pores to leave the seal perfect.

The process may be used not only on cured cheese but also upon soft cheese curd. It has the advantages of complete removal of all air and gases from the curd and the closing of internal voids. As in the treatment of cheese or meat, the surface of the block of curd is left sterile and the wrap is effectively adhered to the curd over its entire area and remains thus adhered without continued pressure. The cheese may thereupon be stored without requiring pressure during storage.

In order to use this invention on cheese curd, the freshly made curd will ordinarily be placed into a block of desired size and shape which will be wrapped with vinyl chloride or other membrane as herein disclosed. The wrap is left unsealed but has lapping margins. If the wrap is as then as .005 to .001 inch in thickness, folds or creases will be immaterial because of the pliable nature of the thin material. In treating curd it is particularly desirable to use mechanical pressure as presently to be disclosed, the curd preferably being free to expand during the initial vacuum steam for the release of contained gases, and having its form restored by pressure before completion of the second vacuum step. Preferred steam treatment of curd is at 180° F. to 200° F. Advantages include production of cheese blocks of uniform density which can be cut readily to identical weights.

When the above described process is applied to blocks of fresh cheese curd, a distinctive product is the result.

The removal of entrained gases, cracks and mechanical voids causes an average increase of density of about 3.6%. When the internal rams operated during vacuum treatment are used as described, the blocks, which are usually made to dimensions of 11 inches x 14 inches x 3.5 inches thick, contract along the 3.5 inch dimension and become about .125 inch thinner. When a block is cut, the distinction from similar blocks prepared by the methods heretofore used is evident in that cracks and holes are absent. The cheese has a uniform texture.

The outward appearance of a block of cheese prepared by my method is distinctive when transparent wrap materials are used. The adhesion of a transparent wrap is so complete that the lines of fold are not distinguishable, and the wrap appears as a part of the cheese surface. The cheese appears smooth as though it were a hard substance polished. The plane of contact between the wrap and the cheese is not easily distinguishable. The membrane does not pull away from the curd when pressure is released, which is a distinction from cheese wrapped by the pressure methods heretofore used.

Reference has been made to the optional use of a pressure step during treatment, this step desirably being employed during the latter part of the second application of vacuum to the product. In the preferred practice of the invention, this step is employed. Various rams operate pressure plates within the treatment chamber 20. Fig. 5 shows all three of the pressure plates desirably used.

One pressure plate 100 is at the top of the treatment chamber and is operated by a ram 101. Another pressure plate 102 is at the side of the treatment chamber and is operated by ram 103. The third pressure plate 104 is at the rear of treatment chamber and this is operated by ram 105 which has a relatively long stroke so that it may be used not only to apply pressure but to eject the work from the chamber when the door of the chamber is opened.

Rams 101 and 103 have relatively short strokes, since the boxed product is only slightly compressible. For the same reason the movement of the rear pressure plate 104 is relatively slight during compression of the box. Its greater length of movement is utilized only for ejection.

As shown in the cycle diagram, Fig. 6, the rams are operated to subject the work to pressure only during the latter part of the second vacuum treatment. The mechanical pressure on the product while the high vacuum continues aids in discharging all residual vapors and gases from the packages and contents, and it further aids in reshaping the packages and contents and maintaining their form so that the subsequent relief of vacuum and application of atmospheric pressure will force the wrapper into intimate contact with relatively regular and smooth surfaces of the contents. While the cycle diagram shows the mechanical pressure released coincidentally with the relief of vacuum, in practice I maintain the mechanical pressure until after the vacuum has been completely relieved.

It is very important to understand the principles involved in the high vacuum treatment, since the maximum limit of absolute pressure is a variable depending upon the vapor pressure of the product, and this in turn depends mostly upon the temperature of the product. We have two conditions or limits. (1) The absolute pressure has to go below the vapor pressure of the product, and (2) it has to stay there maintaining outward flow for a certain time interval. In the commercial operation of the process, defective adhesion of wrap becomes visible whenever the first vacuum has been incomplete, or the time of application too short. In practice, also, the temperature of the cheese is carefully controlled. If it is too cold, air removal will be incomplete with a degree of vacuum and a time interval which would have been sufficient at a higher temperature. The preferred temperature range is 60° F. to 70° F. for packaged cheese. The requirements cannot be defined in terms of absolute pressure only. The other factors have to be considered.

I claim:

1. The process of producing an air free package of water-containing food which consists of enclosing and partially sealing the product in a substantially impervious wrap, then evacuating free air from around the wrapped food, then maintaining the wrapped food in a very high vacuum at an absolute pressure sufficiently below the vapor pressure of the water content of the food to effect rapid boiling of water vapor from the surface of the food to eliminate residual free air and combined air, then raising the pressure about the wrapped food by admitting steam, then evacuating the steam and sealing the wrap about and to the food by mechanical pressure, and thereafter releasing the vacuum.

2. The process of packaging cheese which consists of cutting the cheese into units of uniform size, wrapping the cheese in a substantially impervious plastic membrane, partially sealing the membrane, then subjecting the wrapped cheese to very high vacuum at a pressure greatly below the vapor pressure of the cheese to effect rapid water vapor ebullition, then partially discharging the vacuum by steam, then restoring high vacuum by withdrawing the steam, and applying pressure to hold the wrapper sealed and finally restoring the wrapped cheese to atmospheric pressure.

3. A method of surface sterilization of a water-containing food product, which method comprises the steps of producing ebullition of water vapor therefrom by subjecting the product to a vacuum having a pressure materially lower than the vapor pressure of the product and then exposing the product to steam at a temperature approximately at least 150° F. for a period sufficient to heat only the surface of the product, wrapping the product in a film of synthetic resin before exposing it to steam, and including the further step of subjecting the product and wrapper to mechanical pressure and vacuum and sealing the wrapper, and subsequently relieving the vacuum to which it is subject after the wrapper is sealed.

4. The process of packaging a water-containing food which consists of wrapping the food in an impermeable plastic web, closing the web about the food, evacuating the free oxygen, the dissolved oxygen, the occluded oxygen and the adsorbed oxygen with water vapor from the wrapped food by abruptly reducing the pressure of the atmosphere about it to an absolute pressure materially below the vapor pressure of the food within the package to effect rapid ebullition of water vapor from the surface of the food, whereby to use the latent heat of volume to carry off the oxygen, maintaining the pressure of the atmosphere about the package below the vapor pressure of the food until substantially all of the oxygen has been carried off, and thereupon sealing the web about the food.

5. The process of claim 4 in which evacuating water vapor and oxygen from the food is followed by introducing an atmosphere of water vapor about the wrapped food at a temperature approximately at least 150° F. for a period only sufficiently long to heat the surface, and thereafter abruptly evacuating the atmosphere of water vapor to effect quick cooling of the heated surface of the food prior to completely sealing the web.

6. The process defined in claim 4 including the step of subjecting the plastic web and the food therein wrapped to mechanical pressure incident to the sealing of the web.

7. The process of claim 4 in which evacuating oxygen is followed by the steps of introducing water vapor at a temperature approximating at least 150° F. about the wrapped food, again exposing the food to high vacuum to effect ebullient withdrawal of water vapor and any residual oxygen, and simultaneously subjecting the wrapped food to mechanical pressure to facilitate such withdrawal and the sealing of the web about the food as aforesaid.

8. The method of effecting removal of free and combined oxygen from a water-containing food which consists in withdrawing free and occluded and dissolved and adsorbed oxygen from the food by subjecting the food to an ambient pressure below its vapor pressure and no higher than approximately 13 mm. absolute until the food gives off approximately 50 cu. ft. of vapor for every cubic foot of free space about the food, and sealing the food in an impervious enclosure while the food remains substantially wholly free of oxygen.

9. The method recited in claim 8 in which final sealing is preceded by the step of briefly heating the surface of the food by exposing it to steam at a temperature approximating at least 150° F. while maintaining all portions of the food other than its surface at a temperature not exceeding a normal range of atmospheric temperature, and thereafter again subjecting the food to an ambient pressure greatly lower than its vapor pressure before said sealing of said impervious enclosure.

10. A method of surface sterilization of a food product which contains water, which method comprises wrapping the product in a film of synthetic resin which is pervious to oxygen in the presence of water vapor and becomes impervious when dry, subjecting the wrapped product at atmospheric temperature to a very high vacuum at an absolute pressure no greater than 13 mm. of mercury, the said vacuum being so far below the vapor pressure of the product as to cause violent ebullition of water vapor therefrom to entrain oxygen and withdraw the oxygen with such vapor from the product, continuing such withdrawal for an appreciable period, thereafter exposing the product to steam at a temperature of at least 150° F. for a period sufficient to heat only the surface of the product without materially raising the temperature of interior portions of the product, the further step of evacuating the water vapor and any residual oxygen from about the product, thereby cooling the surface of the product, and sealing the wrapping film.

11. A method of sterile packaging a water-containing food product while maintaining all portions other than the surface of the food product within normal atmospheric temperatures, such method including the steps of wrapping the product in a synthetic resin film, enclosing the wrapped product in a vacuum chamber and subjecting it to a vacuum sufficient to reduce the ambient pressure to a value no greater than 13 mm. and sufficiently below the vapor pressure of the water content of the product as to effect violent ebullition of water vapor from the product to entrain free oxygen, occluded oxygen, dissolved oxygen and adsorbed oxygen, withdrawing the vapor and oxygen from the vicinity of the product, at least partially relieving the vacuum after a period of a very few minutes by admitting steam to said chamber at a temperature of at least approximately 150° F., withdrawing the steam from about the wrapped product before it has time to heat more than the surface of the product, again subjecting the product to very high vacuum, thereby evaporating water vapor from the surface of the product and instantly reducing the temperature of the surface of the product, and sealing said wrapping film to itself about the product and subsequently relieving the vacuum.

12. The method described in claim 11 including the further step of subjecting the wrapped product to mechanical pressure during the period of its subjection to high vacuum whereby to press the wrapping film against the product, the product containing a fat exposed at its surface by the steam, and the fat assisting in rendering impervious the wrapping film pressed into contact with the product.

13. The method recited in claim 11 in which the first high vacuum treatment has a duration of less than approximately two minutes, the product is exposed to steam for approximately one-half minute and the second high vacuum treatment has a duration of less than two minutes.

References Cited in the file of this patent

UNITED STATES PATENTS

| | | |
|---|---|---|
| 605,738 | Moyet | June 14, 1898 |
| 1,859,147 | Kuezynski | May 17, 1932 |
| 2,128,175 | Baer | Aug. 23, 1938 |
| 2,189,512 | Berch | Feb. 6, 1940 |
| 2,471,867 | Fisher et al. | May 31, 1949 |
| 2,540,815 | Eldredge | Feb. 6, 1951 |
| 2,684,905 | Grindrod | July 27, 1954 |
| 2,698,249 | Fisher | Dec. 28, 1954 |
| 2,768,085 | Erekson et al. | Oct. 23, 1956 |